(12) United States Patent
Kohama et al.

(10) Patent No.: US 6,704,550 B1
(45) Date of Patent: Mar. 9, 2004

(54) ANTENNA SWITCHING CIRCUIT AND COMMUNICATION SYSTEM USING THE SAME

(75) Inventors: Kazumasa Kohama, Kanagawa (JP); Daisuke Fukui, Kanagawa (JP)

(73) Assignee: Sony Corporation (JP)

( * ) Notice: Subject to any disclaimer, the term of this patent is extended or adjusted under 35 U.S.C. 154(b) by 403 days.

(21) Appl. No.: 09/660,399

(22) Filed: Sep. 12, 2000

(30) Foreign Application Priority Data

Sep. 14, 1999 (JP) .......................................... P11-260734

(51) Int. Cl.[7] ................................................ H04B 1/04
(52) U.S. Cl. ........................ 455/114; 455/296; 455/78; 455/83
(58) Field of Search .............................. 455/78–83, 296, 455/114; 333/101, 103–105, 124, 127–128

(56) References Cited

U.S. PATENT DOCUMENTS

| | | | | |
|---|---|---|---|---|
| 4,011,512 A | * | 3/1977 | Drury ........................ | 325/150 |
| 5,054,114 A | | 10/1991 | Erickson ...................... | 455/78 |
| 5,815,804 A | * | 9/1998 | Newell et al. ................ | 455/78 |
| 5,893,026 A | * | 4/1999 | Kim .......................... | 455/114 |
| 5,939,939 A | * | 8/1999 | Gaynor et al. ........... | 330/124 R |
| 5,973,568 A | * | 10/1999 | Shapiro et al. ............. | 330/295 |

FOREIGN PATENT DOCUMENTS

| | | |
|---|---|---|
| EP | 0 446 050 A | 9/1991 |
| EP | 0 729 239 A | 8/1996 |

* cited by examiner

*Primary Examiner*—Vivian Chin
*Assistant Examiner*—Tuan Tran
(74) *Attorney, Agent, or Firm*—Rader, Fishman & Grauer PLLC; Ronald P. Kananen

(57) ABSTRACT

An antenna switching circuit and communication system capable of reducing a high-order harmonic component radiated from the antenna used for transmission and reception. A fundamental wave passes through a signal transmission line between an antenna switch and a transmitting circuit, a filter circuit is connected for reflecting the high-order harmonic component, the high-order harmonic component generated due to linear distortion of the antenna switch is propagated toward the antenna and the transmitting circuit, the high-order harmonic component is reflected at a node of the filter circuit, and the reflected signal is propagated toward the antenna through the antenna switch. By suitably controlling a reflection characteristic of the filter circuit and a line of the signal transmission line, the high-order harmonic components on the transmission line are cancelled out and the high-order harmonic component from the antenna can be decreased.

16 Claims, 3 Drawing Sheets

ANTENNA SWITCHING CIRCUIT AND COMMUNICATION SYSTEM USING THE SAME

BACKGROUND OF THE INVENTION

1. Field of the Invention

The present invention relates to an antenna switching circuit, more particularly to an antenna switching circuit for enabling a transmitting circuit and receiving circuit to share one antenna and for switching the antenna to the transmitting circuit or receiving circuit at the time of transmission or reception and a communication apparatus configured by using the same.

2. Description of the Related Art

In a receiving terminal unit in a mobile communication system, for example, a terminal unit of a car phone or cellular phone system, a transmitting circuit and receiving circuit share one antenna. In this case, usually, an antenna switching circuit is provided between the antenna and the transmitting circuit and receiving circuit. The antenna switching circuit switches the antenna to the transmitting circuit side at the time of transmission and switches the antenna to the receiving circuit side at the time of reception.

In a terminal unit configured in this way, at the time of transmission, a high frequency transmission signal (RF signal) generated by the transmitting circuit is propagated to the antenna through the antenna switching circuit and is emitted into the air by the antenna as a radio signal. At the time of reception, the high frequency signal received by the antenna is supplied to the receiving circuit through the antenna switching circuit.

By providing the antenna switching circuit, the transmitting and receiving circuits can share one antenna and the, communication terminal unit can be made more compact and lighter in weight.

In a communication terminal unit having the above configuration, however, measures are required to prevent high frequency signal leakage caused by the antenna switching circuit. This is because, to prevent radio interference etc., it is required that the amount of emission of a high frequency signal other than of the transmission signal band from a communication unit be kept below a constant reference value. Therefore, in a communication unit, it is necessary to suppress the generation of a high-order harmonic signal in the circuit parts handling a high frequency signal, for example, in not only a high frequency amplification circuit and local oscillation circuit, but also the antenna switching circuit. In general, to suppress the high-order harmonic signal from the antenna switching circuit, measures may be taken such as improving the linearity of a transmission characteristic of the passband of the antenna switching circuit itself or providing a filter for removing the high-order harmonics at the antenna terminal side.

However, it is technically difficult to pass the high power RF signal generated by the transmitting circuit through the antenna switching circuit with low distortion due to the restrictions of the power supply voltage. Moreover, the signal is transmitted and received by different frequency bands in many cases. Since it is necessary for one antenna to handle high frequency signals of different frequency bands, the desired level of effect often cannot be obtained even if using a filter for removing the high-order harmonics at the antenna side.

Moreover, the high-order harmonic signal output to an antenna terminal of the antenna switching circuit, that is, signal output terminal, fluctuates due to the high frequency band impedance of the circuit connected to an input terminal. Usually, in a high-order harmonic measurement and evaluation path or the settings of a communication unit, the impedance at the high-order harmonic band of the circuit connected to the signal input terminal often is off from 50Ω. Therefore, the level of the high-order harmonics at the antenna terminal side fluctuates due to the snaking of the signal transmission line or the impedance of the circuits connected thereto. Depending on the evaluation conditions, there is a possibility of the set specifications not being met. It is sometimes not possible to effectively prevent leakage of a high-order harmonic signal from the antenna based on the evaluation results.

SUMMARY OF THE INVENTION

The present invention has been made to solve the above problems and has as its object to provide an antenna switching circuit, in a communication system where the transmitting and receiving circuits share an antenna, providing a filter for reflecting back high-order harmonic components between an antenna switch and a transmitting circuit to enable a reduction of the high-order harmonics generated from the antenna switch and a communication apparatus using the same.

According to the present invention, there is provided a communication system comprising: an antenna; a reception circuit receiving a signal received at the antenna; a transmission circuit sending a transmission signal to be transmitted to the antenna; a switch circuit provided between the antenna and the transmission circuit; and a filter circuit provided between the switch circuit and the transmission circuit.

The filter circuit reflects a signal component having a predetermined high frequency band in the transmission signal.

The filter circuit reflects a signal component having a predetermined high frequency band in the transmission signal to the switch circuit.

A first signal transfer line having a predetermined impedance is provided between the switch circuit and the filter circuit.

A second signal transfer line is provided between the transmission circuit and the filter circuit.

According to the present invention, there is also provided a communication system comprising: an antenna; a reception circuit receiving a signal received at the antenna; a transmission circuit sending a transmission signal to be transmitted to the antenna; a switch circuit provided between the antenna and the transmission circuit; and a filter circuit provided among the switch circuit, the transmission circuit and the reception circuit, said filter circuit passing a fundamental wave component in the transmission signal and reflecting a signal component having a predetermined high frequency band in the transmission signal.

The antenna switching circuit of the present invention is an antenna switching circuit for enabling a transmitting circuit and a receiving circuit to share single antenna and for switching the antenna to the transmitting circuit at the time of transmission or the receiving circuit at the time of transmission or reception, comprising an antenna switch connecting the antenna to the transmitting circuit at the time of transmission and connecting the antenna to the receiving circuit at the time of reception and a filter circuit which is connected to at least a signal transmission line between the antenna switch and the transmitting circuit and reflects back a signal of a predetermined high frequency band propagated through the signal transmission line.

Further, the communication system of the present invention is a communication system for transmission and reception sharing single antenna, comprising a transmitting circuit for transmitting a high frequency signal by using the antenna; a receiving circuit for receiving a radio signal by the antenna; an antenna switch for connecting the antenna to the transmitting circuit at the time of transmission and the antenna to the receiving circuit at the time of reception; and a filter circuit which is connected to at least a signal transmission line between the antenna switch and the transmission circuit and reflects back a signal of a predetermined high frequency band propagated through the signal transmission line.

In the present invention, preferably, a high-order harmonic component generated in the antenna switch corresponding to a transmission signal output by the transmitting circuit is propagated toward both the antenna and the transmitting circuit, and the high-order harmonic component propagated toward the transmitting circuit is reflected by the filter circuit and propagated toward the antenna through the antenna switch.

In the present invention, preferably, an amplitude of the high-order harmonic component reflected by the filter circuit is controlled by a reflection characteristic of the filter circuit or a phase of the high-order harmonic component reflected by the filter circuit is controlled by a length of the signal transmission line between the filter circuit and the antenna switch.

In the present invention, preferably, the reflection characteristic of the filter circuit and a length of the signal transmission line between the antenna and the antenna switch are controlled so that the high-order harmonic component propagated from the antenna switch in the signal transmission line between the antenna switch and the antenna and the high-order harmonic component reflected by the filter circuit become substantially the same in amplitude and inverse in phase.

According to the present invention, the wireless communication terminal unit with transmitting and receiving circuits sharing one antenna is provided with a filter circuit allowing the passage of a fundamental wave propagated over a signal transmission line between an antenna switch and the transmitting circuit, exhibiting a high impedance with respect to a high-order harmonic component of the fundamental wave generated by the antenna switch, and reflecting back the high-order harmonic signal. A high-order harmonic component is generated by the antenna switch in accordance with the transmission signal from the transmitting circuit at the time of transmission due to the linear distortion of the antenna switch etc. and is propagated toward the antenna and transmitting circuit. The high-order harmonic component propagated toward the transmitting circuit by the filter circuit provided on the signal transmission line between the antenna switch and the transmitting circuit is reflected back, propagated again toward the antenna switch, and further propagated toward the antenna through the antenna switch.

By controlling the reflection characteristic of the filter circuit, for example, the reflectance, and further by controlling the signal transmission line length between the filter circuit and the antenna switch, the high-order harmonic component generated by the antenna switch and the high-order harmonic component reflected by the filter circuit are controlled to become substantially the same in amplitude and inverse in phase on the signal transmission line between the antenna and the antenna switch, so the high-order harmonic components on the signal transmission line are substantially removed and the emission of a high-order harmonic signal from the antenna can be suppressed.

BRIEF DESCRIPTION OF THE DRAWINGS

These and other objects and features of the present invention will become clearer from the following description of the preferred embodiments given with reference to the accompanying drawings, in which.

DESCRIPTION OF THE PREFERRED EMBODIMENTS

Below, preferred embodiments will be described with reference to the accompanying drawings.

Figure 1:
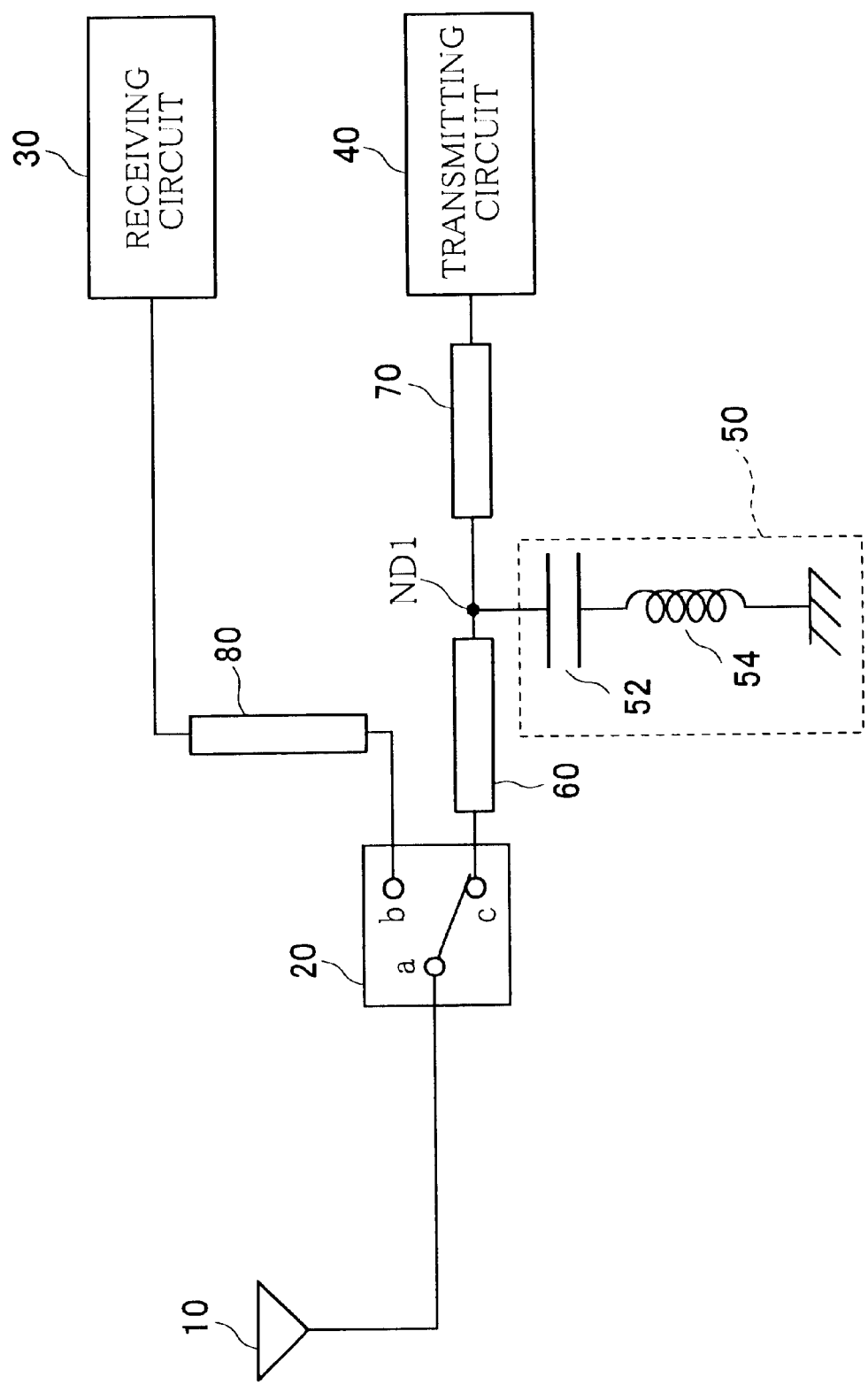
FIG. 1 is a circuit diagram of an embodiment of an antenna switching circuit according to the present invention.

FIG. 1 is a circuit diagram of an embodiment of an antenna switching circuit according to the present invention and shows an example of the configuration of a communication terminal including the antenna switching circuit.

In this communication terminal, an antenna 10 is shared by a receiving circuit 30 and a transmitting circuit 40. As shown in the figure, a terminal a of an antenna switch 20, that is, a signal output terminal, is connected to the antenna 10, a terminal b is connected to the receiving circuit 30, and a terminal c is connected to the transmitting circuit 40. In the present embodiment, a filter circuit 50 is provided between the antenna switch 20 and the transmitting circuit 40.

Signal transmission lines with a predetermined characteristic impedance are connected between the antenna switch 20 and the transmitting circuit 40 and receiving circuit 30. For example, a signal transmission line 80 is connected between the terminal b of the antenna switch and the receiving circuit 30, a signal transmission line 60 is connected between the terminal c of the antenna switch 20 and a node ND1 of the filter circuit 50, and a signal transmission line 70 is connected between the node ND1 of the filter circuit 50 and the transmitting circuit 40. The characteristic impedance of these signal transmission lines is, for example, 50Ω.

The antenna 10 is shared by the transmitting and receiving circuits. That is, at the time of transmission, an RF signal generated by the transmitting circuit 40 is emitted as a radio wave in the air by the antenna 10. At the time of reception, a high frequency signal is excited in the antenna 10 by the radio wave propagated through the air and the high frequency signal is supplied to the receiving circuit 30 as a reception signal.

The antenna switch 20 connects the transmitting circuit 40 and receiving circuit 30 to the antenna 10 according to the transmitting and receiving operations. At the time of transmission, the antenna switch 20 connects the terminal a to the terminal c and disconnects the terminal a from the terminal b. Therefore, the RF signal generated by the transmitting circuit 40 is propagated to the antenna 10. At the time of reception, the antenna switch 20 connects the terminal a to the terminal b and disconnects the terminal a from the terminal c. Therefore, the high frequency reception signal excited in the antenna 10 is propagated to the receiving circuit 30.

Figure 2:
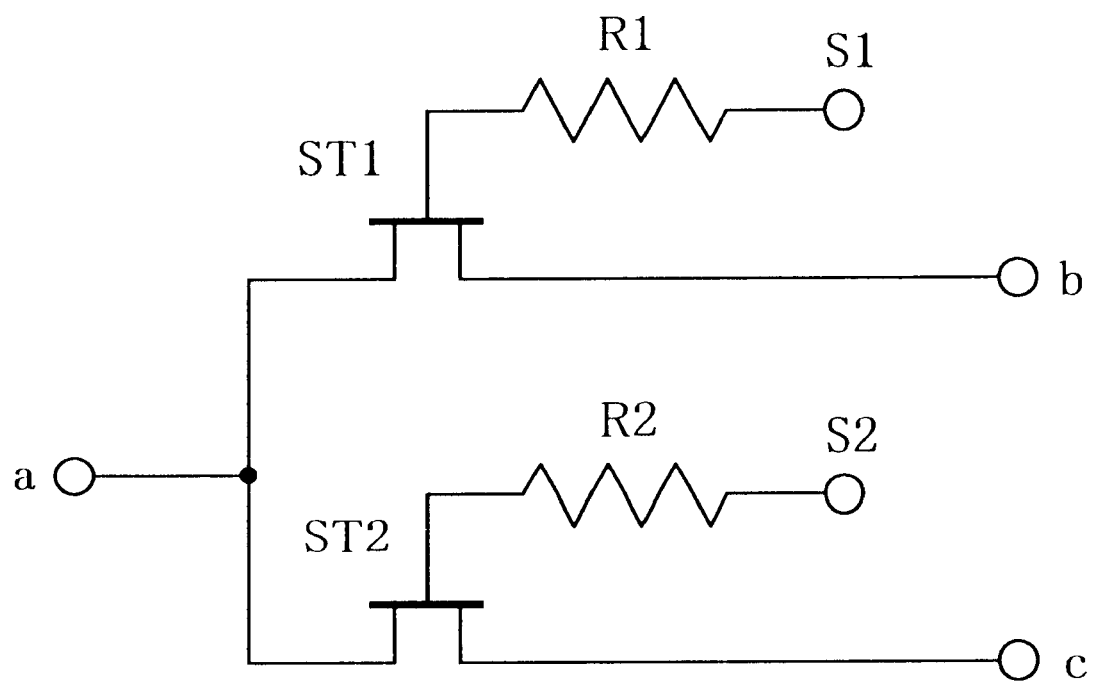
FIG. 2 is a circuit diagram of one example of the configuration of an antenna switch.

The antenna switch 20 comprises, for example, a high frequency field effect transistor (hereinafter referred to simply as a high frequency FET for convenience). FIG. 2 shows an example of the configuration of the antenna switch 20. Here, the antenna switch 20 comprises mainly two high frequency FETs ST1 and ST2.

The high frequency FET ST1 is connected between the terminal a and the terminal b, while the high frequency FET ST2 is connected between the terminal a and the terminal c. The terminal a is connected to the antenna 10, while the terminals b and c are respectively connected to the receiving circuit 20 and the transmitting circuit 40.

A control signal S1 is input to a gate of the high frequency FET ST1 via a resistance element R1, while a control signal S2 is input to a gate of the high frequency FET ST2 via a resistance element R2. The resistance elements R1 and R2 are resistance elements with a high resistance value of, for example, 10s to 100s of kΩ. The high frequency FETs ST1 and ST2 are turned ON/OFF according to the control signals S1 and S2 respectively supplied to their gates. Therefore, the terminal a is connected to either the terminal b or c according to the signal levels of the control signals S1 and S2.

When a high frequency FET is on, an on resistance of for example just several ohms is exhibited between the source and drain, while when it is off, a breaking capacity of for example 100s of Ff is exhibited between the source and drain.

A high frequency FET with a high resistance element connected to the gate exhibits a clear resistance nature and capacitive nature in the on state and the off state in this way, so has an excellent characteristic as a basic unit of a switching circuit for a quasi-microwave band. Thereby, a high frequency FET is widely used as an antenna switch for a mobile communication terminal unit etc.

However, a high frequency FET used as an antenna switch handles a high power (large amplitude) RF signal. Further, along with the increasing reduction in the power supply voltage of portable termiminals, the non-linear characteristics of a high frequency FET have become noticable. Therefore, if an RF signal is given to a high frequency FET, the gate bias voltage becomes modulated by teh RF signal. The larger the amplitude of the RF signal, the more the gate bias voltage is modulated, therefore the output of the high frequency FET is distorted and a high-order harmonic component ends up being generated. To suppress distortion of the FET, use is being made for example of a switching circuit of a multistage configuration comprising a plurality of FETs connected in series, but it is difficult to completely suppress the high-order harmonics.

In the present embodiment, as shown in FIG. 1, the filter circuit 50 is provided between the antenna switch 20 and the transmitting circuit 40, without changing the configuration of the antenna switch 20, and the filter circuit 50 is used to suppress emission of a high-order harmonic signal to the terminal a side of the antenna switch 20.

As shown In FIG. 1, the filter circuit 50 comprises a capacitor 52 and Inductance (inductance coil) 54 connected In series between a node ND1 and ground potential GND. By suitably setting the LC constant, defined by the values of the capacitor 52 and inductance 54, It is possible to Impart to the filter circuit 50 the characteristic of passing the fundamental wave and reflecting the high-order harmonics.

That is, the RF signal generated by the transmitting circuit 40 is propagated to the antenna switch 20 without being attenuated by the filter circuit 50. On the other hand, the high-order harmonic signal generated in the antenna switch 20 is propagated toward both the transmission antenna 10 and the transmitting circuit 40. The high-order harmonic signal propagated toward the transmitting circuit 40 is reflected back at the connection node ND1 of the filter circuit 50 and transmission line and propagated toward the antenna switch 20.

Below, the suppression of the high-order harmonic component in the present embodiment will be explained in detail referring to FIG. 3.

Figure 3:
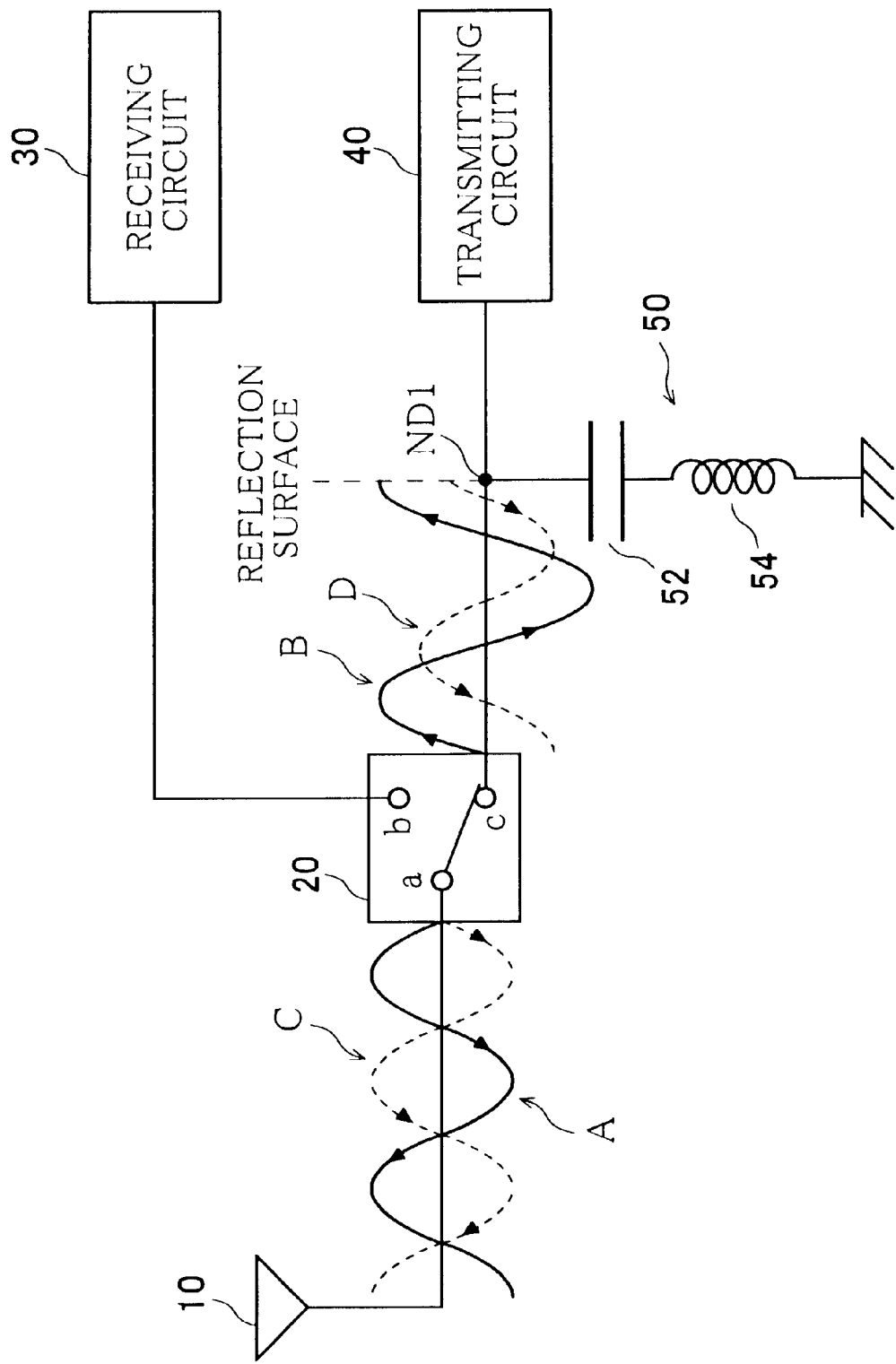
FIG. 3 is a view for explaining a principle of suppression of a high-order harmonic signal in the present invention.

FIG. 3 shows the circuit of FIG. 1 in a simplified form. As shown in the figure, the filter circuit 50 consisting of the capacitor 52 and inductance 54 connected in series is connected to the node ND1 on the transmission line between the antenna switch 20 and the transmitting circuit 40.

As explained above, at the time of transmission, the RF signal generated by the transmitting circuit 40 is propagated to the antenna switch 20. The high-order harmonic components of the RF signal, for example, the second harmonic or third harmonic, are generated due to the non-linear characteristic of the antenna switch 20.

In FIG. 3, a waveform A shows the high-order harmonic signal emitted from the antenna switch 20 toward the antenna 10, while a waveform B shows the high-order harmonic signal emitted from the antenna switch 20 toward the transmitting circuit 40. Note that here the high-order harmonic components are not particulary limited to the second harmonic or third harmonic components is propagated in the signal transmission line between the antenna 10 and the antenna switched 20 and between the antenna switch 20 and the transmitting and receiving circuits. However, in FIG. 3, the waveform of the fundamental wave is omitted and only the waveforms of the high-order harmonic components which become a problem are shown.

Since the filter circuit 50 reflects back the high-order harmonic signal propagated from the antenna switch 20, as shown in FIG. 3, the incident high-order harmonic signal B is reflected at the node ND1 and a reflected signal D with a predetermined phase and amplitude is propagated toward the antenna switch 20. Further, the high-order harmonic signal D is propagated toward the antenna 10 through the antenna switch 20. That is, as shown in FIG. 3, on a signal line between the antenna 10 and the antenna switch 20, the high-order harmonic signal A emitted from the antenna switch 20 toward the antenna 10 and the high-order harmonic signal D reflected at the filter 50 are passed through the antenna switch 20, and two high-order harmonic components of a high-order harmonic signal C propagated toward the antenna 10 are propagated.

In the present embodiment, by controlling the amplitude and the waveform of the reflected high-order harmonic signal C, the high-order harmonic components A and C on the signal transmission line between the antenna 10 and the antenna switch 20 are made to cancel each other out. That is, by controlling the reflected high-order harmonic component C to become the same in amplitude as and inverse in phase to the high-order harmonic component A, the high-order harmonic signals A and C are canceled out and it is possible to remove the high-order harmonic components on the signal transmission line between the antenna 10 and the antenna switch 20.

In the filter circuit 50, the reflectance of a high-order harmonic signal is controlled by the LC constant determined by the capacitor 52 and inductance 54. That is, since the reflectance of the filter circuit 50 can be controlled by controlling the values of the capacitor 52 and inductance 54 according to the frequency of the high-order harmonic component to be controlled, the amplitudes of the high-order harmonic component D reflected back at the node ND1 and the high-order harmonic component after passing through the antenna switch 20 are controlled. Further, by controlling the length of the signal transmission line between the node of the filter circuit 50, that is, the node ND1, and the antenna switch 20, the phase of the high-order harmonic component C after passing through the antenna switch 20 can be controlled.

By suitably setting the values of the capacitor 52 and inductance 54 which configure the filter circuit 50 according to the frequency of a high-order harmonic component to be suppressed and controlling the length of the transmission line between the node ND1, that is, the node of connection of the filter circuit 50 with the transmission line, it is possible to suitably control the amplitude and the phase of the reflected signal of the high-order harmonic propagated toward the antenna 10 through the antenna switch 20, so it is possible to make the high-order harmonic components A and C in the signal transmission line between the antenna 10 and the antenna switch 20 cancel each other out. Further, since, by connecting the filter circuit 50, the impedance with respect to the high-order harmonic component on the transmitting circuit 40 seen from the antenna switch 20 is fixed, the state where the high-order harmonic is constantly suppressed becomes possible without being affected by the impedance of the transmitting circuit 40 connected to the signal input terminal of the antenna switch 20, that is, the terminal c, or the snaking of the signal transmission line between them.

As described above, according to the present embodiment, the filter circuit 50 is connected to the signal transmission line between the antenna switch 20 and transmitting circuit 40. The filter circuit 50 has the characteristics of passing the fundamental wave and exhibiting a high impedance with respect to the high-order harmonic components and reflecting them back. A high-order harmonic component is generated according to the transmission signal from the transmitting circuit 40 by the linear distortion of the antenna switch 20. This high-order harmonic component is propagated toward the antenna 10 and the transmitting circuit 40. The high-order harmonic component propagated toward the transmitting circuit 40 is reflected back at the node ND1 of the filter circuit 50, and the reflected signal is propagated toward the antenna 10 through the antenna switch 20. By suitably controlling the reflection characteristics of the filter circuit 50 and length of the signal transmission line between the node ND1 and antenna switch 20, the high-order harmonic components on the transmission line between the antenna switch 20 and antenna 10 cancel each other out, the high-order harmonic components can be suppressed, and the emission of high-order harmonic components from the antenna 10 can be decreased.

Note that, in the above explanation, the filter circuit 50 was configured by the capacitor 52 and inductance connected in series, but the configuration of the filter circuit is not especially limited in the present invention. For example, it may also be made a filter which passes the fundamental wave and reflects back the high-order harmonic components with a constant reflectance.

As explained above, according to the antenna switching circuit and communication apparatus of the present invention, the high-order harmonic components on the signal transmission line between the antenna and the antenna switch are made to cancel each other out and the emission of high-order harmonic components from the antenna can be suppressed. Further, according to the present invention, since the impedance with respect to the high-order harmonic signal at the transmitting circuit side seen from the antenna switch is fixed, there is the advantage that a state with the high-order harmonics constantly suppressed can be maintained without being affected by the impedance of the circuit connected to the signal input side of the antenna switch or the snaking of the signal transmission line between them.

While the invention has been described with reference to specific embodiment chosen for purpose of illustration, it should be apparent that numerous modifications could be made thereto by those skilled in the art without departing from the basic concept and scope of the invention.

What is claimed is:

1. A communication system comprising:
   an antenna;
   a reception circuit receiving a signal received at the antenna;
   a transmission circuit sending a transmission signal to be transmitted to the antenna;
   a switch circuit provided between the antenna and the transmission circuit; and
   a filter circuit provided between the switch circuit and the transmission circuit;
   wherein the filter circuit reflects a signal component having a predetermined high frequency band in the transmission signal toward the switch circuit.

2. A communication system according to claim 1, wherein a first signal transfer line having a predetermined impedance is provided between the switch circuit and the filter circuit.

3. A communication system according to claim 2, wherein a second signal transfer line is provided between the transmission circuit and the filter circuit.

4. A communication system according to claim 1, wherein the filter circuit comprises at least a capacitor and inductor one end of which is connected to a reference potential point.

5. A communication system comprising:
   an antenna;
   a reception circuit receiving a signal received at the antenna;
   a transmission circuit sending a transmission signal to be transmitted to the antenna;
   a switch circuit provided between the antenna and the transmission circuit;
   a filter circuit provided among the switch circuit, the transmission circuit and the reception circuit, said filter circuit passing a fundamental wave component in the transmission signal and reflecting a signal component having a predetermined high frequency band in the transmission signal toward said switch circuit.

6. A communication system according to claim 5, wherein a first signal transfer line having a predetermined impedance is provided between the switch circuit and the filter circuit.

7. A communication system according to claim 6, wherein a second signal transfer line is provided between the transmission circuit and the filter circuit.

8. A communication system according to claim 5, wherein the filter circuit comprises at least a capacitor and inductor one end of which is connected to a reference potential point.

9. An antenna switching circuit for enabling a transmitting circuit and a receiving circuit to share a single antenna and for switching the antenna to the transmitting circuit at the time of transmission or the receiving circuit at the time of transmission or reception, comprising:
   an antenna switch connecting the antenna to the transmitting circuit at the time of transmission and connecting the antenna to the receiving circuit at the time of reception, and a filter circuit which is connected to at least a signal transmission line between the antenna switch and the transmitting circuit and reflects back a signal of a predetermined high frequency band propagated through the signal transmission line toward said antenna switch.

10. An antenna switching circuit according to claim 9, wherein the filter circuit has a high impedance characteristic with respect to the signal of the high frequency band.

11. A communication system for transmission and reception sharing a single antenna, comprising:

a transmitting circuit for transmitting a high frequency signal by using the antenna;

a receiving circuit for receiving a radio signal by the antenna;

an antenna switch for connecting the antenna to the transmitting circuit at the time of transmission and the antenna to the receiving circuit at the time of reception; and a filter circuit which is connected to at least a signal transmission line between the antenna switch and the transmission circuit and reflects back a signal of a predetermined high frequency band propagated through the signal transmission line;

wherein a high-order harmonic component generated in the antenna switch corresponding to a transmission signal output by the transmitting circuit is propagated toward both the antenna and the transmitting circuit, and wherein the filter circuit reflects back the high-order harmonic component propagated toward the transmitting circuit and causes the reflected signal to be propagated toward the antenna through the antenna switch.

12. A communication system according to claim 11, wherein an amplitude of the high-order harmonic component reflected by the filter circuit is controlled by a reflection characteristic of the filter circuit.

13. A communication system according to claim 11, wherein a phase of the high-order harmonic component reflected by the filter circuit is controlled by a length of the signal transmission line between the filter circuit and the antenna switch.

14. A communication system according to claim 11 By wherein the reflection characteristic of the filter circuit and a length of the signal transmission line between the antenna and the antenna switch are controlled so that the high-order harmonic component propagated from the antenna switch in the signal transmission line between the antenna switch and the antenna and the high-order harmonic component reflected by the filter circuit become substantially the same in amplitude and inverse in phase.

15. A communication system according to claim 11, wherein the filter circuit comprises a capacitor and inductor connected in series between a predetermined node on the signal transmission line between the antenna switch and the transmitting circuit, and a reference potential.

16. A communication system according to claim 15, wherein the reflection characteristic of the filter circuit is controlled by values of the capacitor and inductor which constitute the filter circuit.

* * * * *